(12) United States Patent
Watai et al.

(10) Patent No.: US 9,825,397 B2
(45) Date of Patent: Nov. 21, 2017

(54) GROMMET-EQUIPPED CONNECTOR AND CONNECTOR

(71) Applicant: YAZAKI CORPORATION, Tokyo (JP)

(72) Inventors: Shoichi Watai, Shizuoka (JP);
Motohisa Kashiyama, Shizuoka (JP);
Takanori Yamawaki, Shizuoka (JP);
Tetsuya Watanabe, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/392,328

(22) Filed: Dec. 28, 2016

(65) Prior Publication Data
US 2017/0201038 A1    Jul. 13, 2017

(30) Foreign Application Priority Data
Jan. 8, 2016 (JP) .................................. 2016-002228

(51) Int. Cl.
*H01R 13/52* (2006.01)
*H01R 107/00* (2006.01)

(52) U.S. Cl.
CPC ..... *H01R 13/5202* (2013.01); *H01R 2107/00* (2013.01); *H01R 2201/26* (2013.01)

(58) Field of Classification Search
CPC ............ H01R 13/5202; H01R 2107/00; H01R 2201/26
USPC ........................................................ 439/271
See application file for complete search history.

(56) References Cited

U.S. PATENT DOCUMENTS

| | | | | |
|---|---|---|---|---|
| 5,252,089 A | * | 10/1993 | Hatagishi | B60R 16/02 439/310 |
| 5,300,734 A | * | 4/1994 | Suzuki | H01R 13/56 174/135 |
| 5,337,447 A | * | 8/1994 | Tanaka | H02G 3/083 16/2.2 |
| 6,600,104 B2 | * | 7/2003 | Nakata | B60R 16/0222 16/2.1 |
| 6,901,627 B2 | * | 6/2005 | Uchida | B60R 16/0222 16/2.1 |
| 8,089,002 B2 | * | 1/2012 | Hasegawa | F16J 3/042 16/2.1 |
| 8,108,968 B2 | * | 2/2012 | Pietryga | H02G 3/0468 16/2.1 |
| 8,651,460 B2 | * | 2/2014 | Callahan | H02G 3/12 174/153 G |

FOREIGN PATENT DOCUMENTS

JP    2009-252557 A    10/2009

* cited by examiner

*Primary Examiner* — Alexander Gilman
(74) *Attorney, Agent, or Firm* — Kenealy Vaidya LLP

(57) ABSTRACT

A grommet-equipped connector includes a connector and a grommet. The connector includes a panel engagement portion configured to be engaged with an attachment hole of a panel and an annular flange configured to face an edge portion of the attachment hole. The grommet includes a panel contact portion configured to be fitted so as to cover the flange and intimately contact the edge portion. A flange fitting groove in which the flange is inserted over an entire perimeter is formed inside the panel contact portion. The flange has a flange protrusion portion protruding outward and guided by the flange fitting groove.

6 Claims, 13 Drawing Sheets

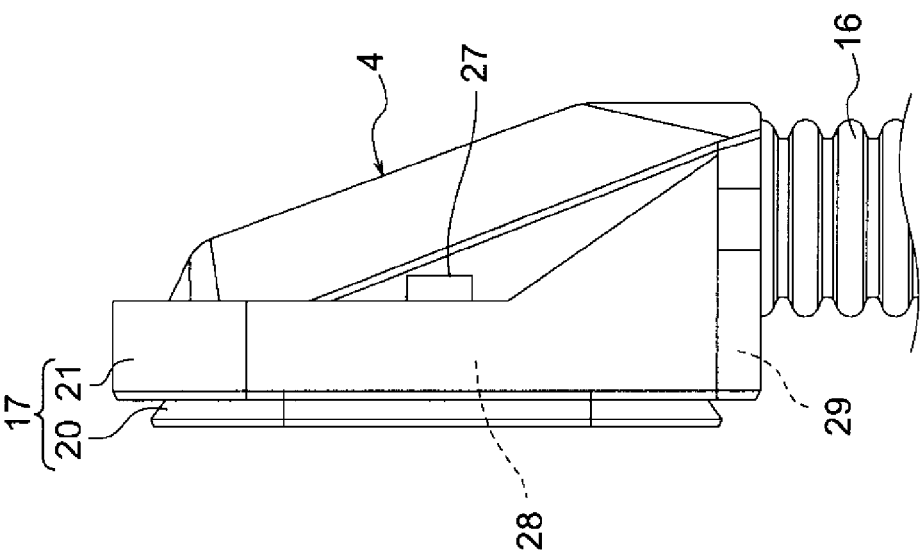
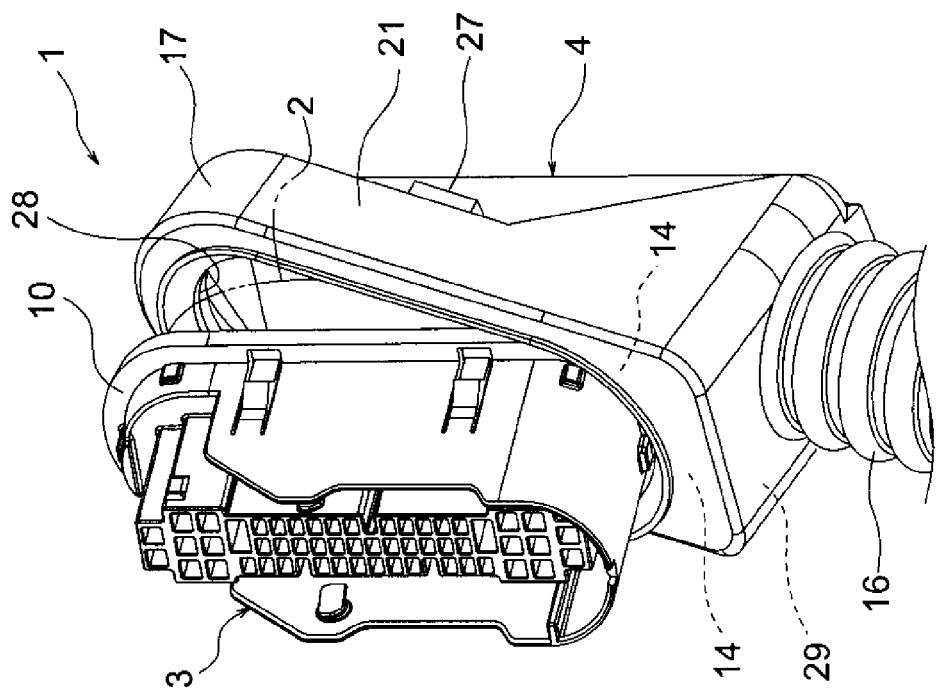

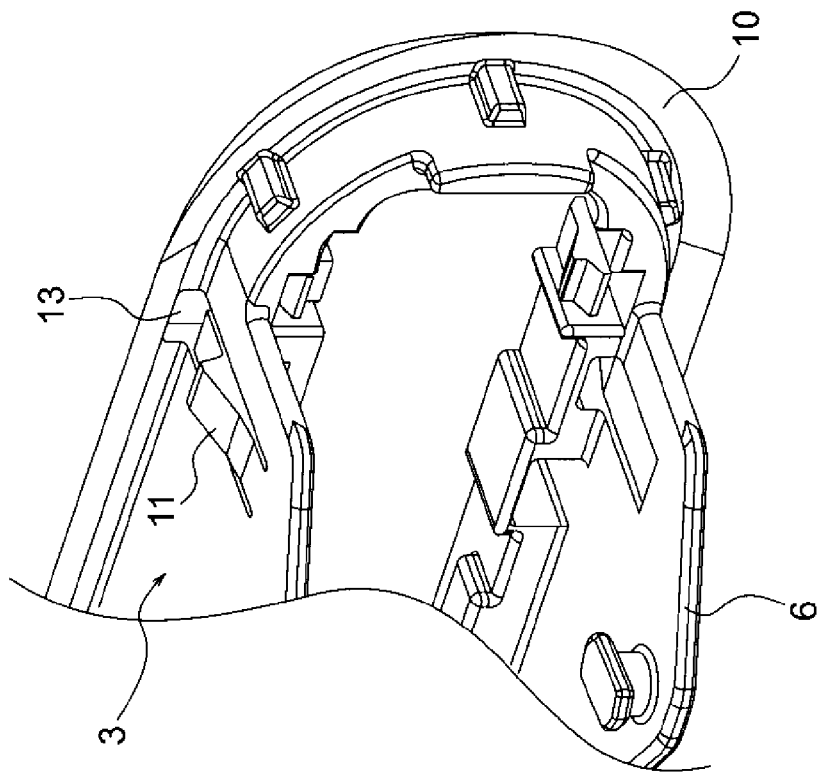
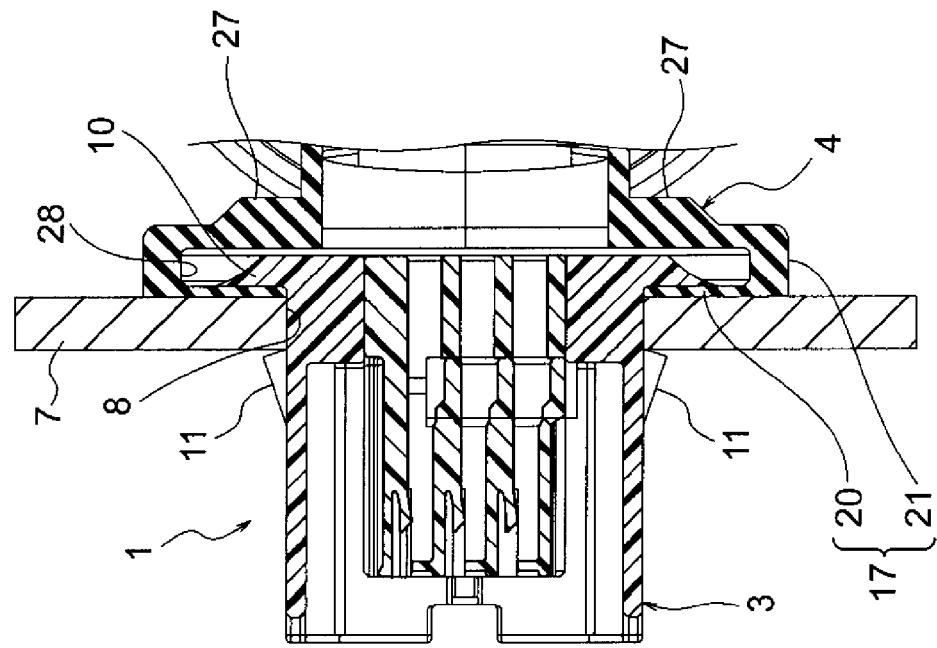
FIG.12A
FIG.12B

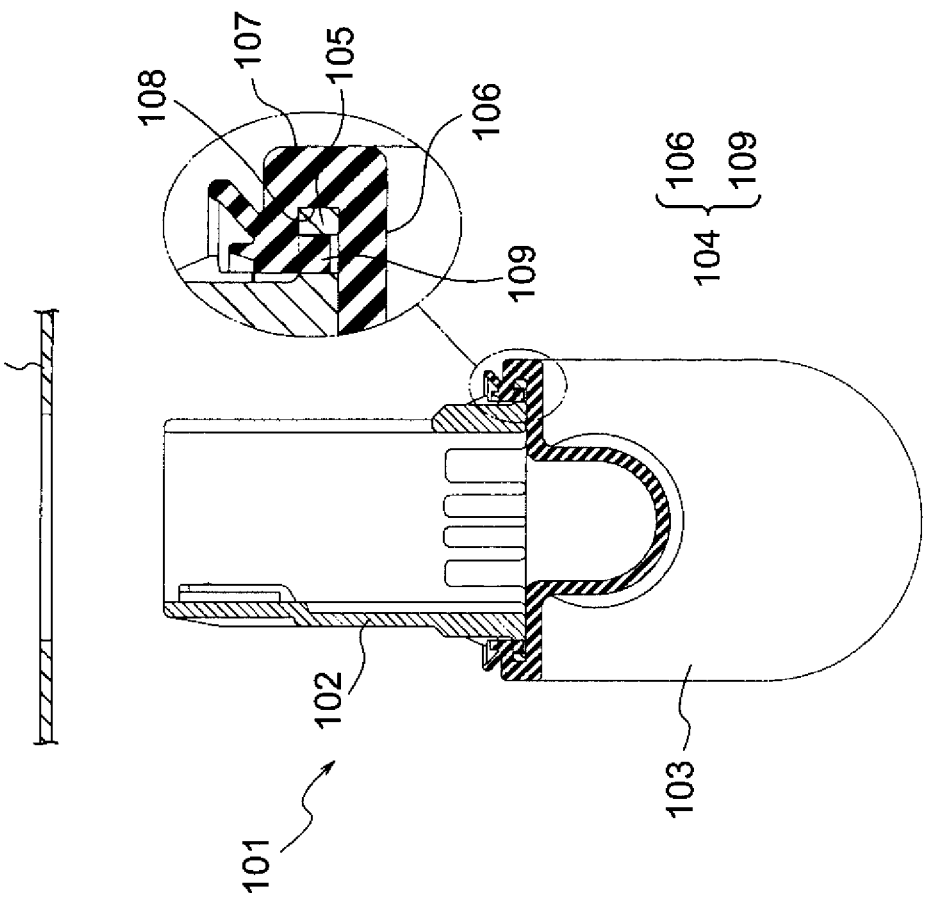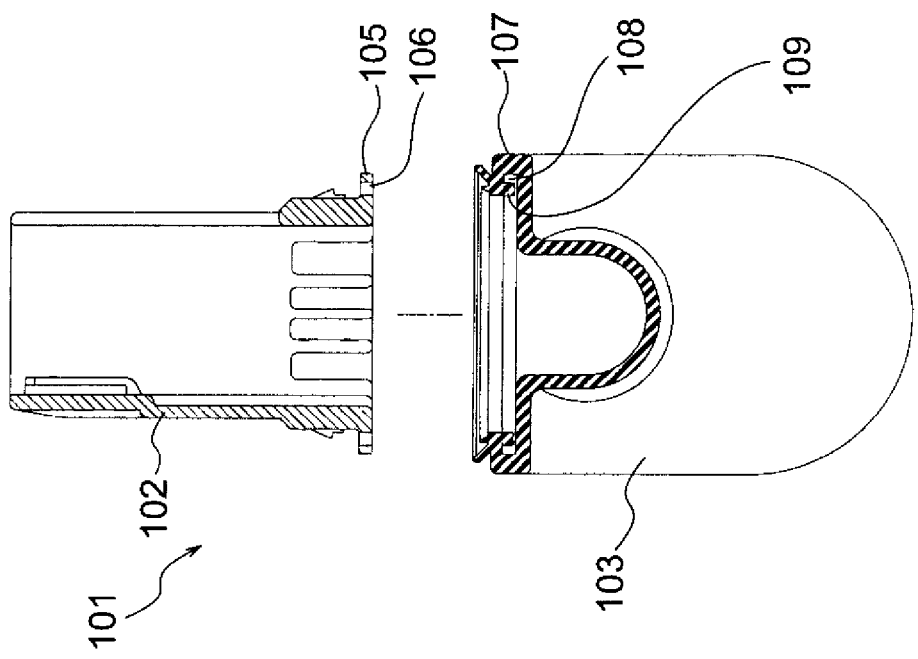

GROMMET-EQUIPPED CONNECTOR AND CONNECTOR

CROSS REFERENCE TO RELATED APPLICATIONS

This application is based on Japanese Patent Application (No. 2016-002228) filed on Jan. 8, 2016, the contents of which are incorporated herein by reference.

BACKGROUND OF THE INVENTION

1. Field of the Invention

The present invention relates to a grommet-equipped connector provided with a connector and a grommet, and more specifically, relates to a grommet-equipped connector where a grommet is fitted so as to cover a flange of the connector and intimately contacts an edge portion of an attachment hole of a panel. Moreover, the present invention relates to a connector constituting the grommet-equipped connector.

2. Description of the Related Art

A grommet-equipped connector which is for establishing electric connection through an attachment hole of a panel is attached in a state where the grommet is fitted to a rear portion of the connector, and when this grommet intimately contacts the panel, waterproofness can be secured. For example, a grommet-equipped connector 101 disclosed in JP-A-2009-252557 shown below (see FIGS. 13A and 13B) enables not only the above-mentioned securement of waterproofness but also detection related to the normal mounting of a grommet 103 on a connector 102. JP-A-2009-252557 shows a proposal of the grommet-equipped connector 101 having a mounting detection portion 104, and the mounting detection portion 104 has a concave portion 106 formed so as to pass through a flange 105 of the connector 102 and a convex portion 109 formed in a flange fitting groove 108 of a panel contact portion 107 in the grommet 103.

According to the above-mentioned mounting detection portion 104, when the panel contact portion 107 is fitted so as to cover the flange 105, in the case of normal mounting, the convex portion 109 of the flange fitting groove 108 is inserted into the concave portion 106 of the flange 105 and the attachment to a panel 110 thereafter is performed without any problem. On the other hand, in the case of half mounting, since the convex portion 109 is not inserted into the concave portion 106, a swelling portion occurs on the panel contact portion 107. For this reason, the attachment to the panel 110 is restricted by the swelling portion.

In the above-described conventional art, since the concave portion 106 is formed on the flange 105 of the connector 102 and the convex portion 109 is formed in the flange fitting groove 108 of the grommet 103 for the detection related to the normal mounting of the grommet 103, a problem arises in that the structure of the grommet 103, particularly, is complicated and this deteriorates the workability at the time of mounting of the grommet 103.

SUMMARY OF THE INVENTION

The present invention is made in view of the above-mentioned circumstances, and an object thereof is to provide a grommet-equipped connector capable of improving the workability at the time of the mounting of the grommet. Moreover, another object of the present invention is to provide a connector constituting the grommet-equipped connector.

There is provided grommet-equipped connector including:
a connector that includes:
a panel engagement portion configured to be engaged with an attachment hole of a panel; and
an annular flange configured to face an edge portion of the attachment hole; and
a grommet that includes a panel contact portion configured to be fitted so as to cover the flange and intimately contact the edge portion,
wherein a flange fitting groove in which the flange is inserted over an entire perimeter is formed inside the panel contact portion; and
wherein the flange has a flange protrusion portion protruding outward and guided by the flange fitting groove.

According to the above configuration, an advantage is produced in that the workability at the time of the mounting of the grommet can be improved.

BRIEF DESCRIPTION OF THE DRAWINGS

FIG. 2A is a rear view and FIG. 2B is a perspective view (first embodiment).

FIGS. 11A and 11B are views of a grommet-equipped connector of the present invention as another example: FIG. 11A is a perspective view showing from the right side a condition in the middle of mounting the grommet on the connector and FIG. 11B is a side view of the grommet (second embodiment).

FIGS. 12A and 12B are views of a grommet-equipped connector of the present invention as another example: FIG. 12A is a cross-sectional view showing a condition when the grommet-equipped connector is engaged with the attachment hole of the panel and FIG. 12B is a perspective view showing a relevant part of a connector frame (third embodiment).

FIGS. 13A and 13B are views of the grommet-equipped connector of the conventional example: FIG. 13A is a cross-sectional view showing a condition in the middle of mounting the grommet on the connector and FIG. 13B is a cross-sectional view showing a condition before the grommet-equipped connector is engaged with the attachment hole of the panel.

DETAILED DESCRIPTION OF THE EXEMPLARY EMBODIMENTS

A grommet-equipped connector includes a connector and a grommet mounted on a rear portion of this connector. The connector has, on the outside thereof, an annular flange facing an edge portion of an attachment hole of a panel. The grommet has a panel contact portion fitted so as to cover the flange and intimately contacting the edge portion of the attachment hole. Inside the panel contact portion, a flange fitting groove in which the flange is inserted over the entire perimeter is formed. Moreover, in the flange fitting groove, a non-through and concave or saclike deep groove portion that is deeper in groove depth than the flange fitting groove is formed. On the flange, a flange protrusion portion protruding outward and guided by the flange fitting groove is formed. This flange protrusion is formed also as a portion inserted in the deep groove portion in a non-through manner.

First Embodiment

Figure 1:
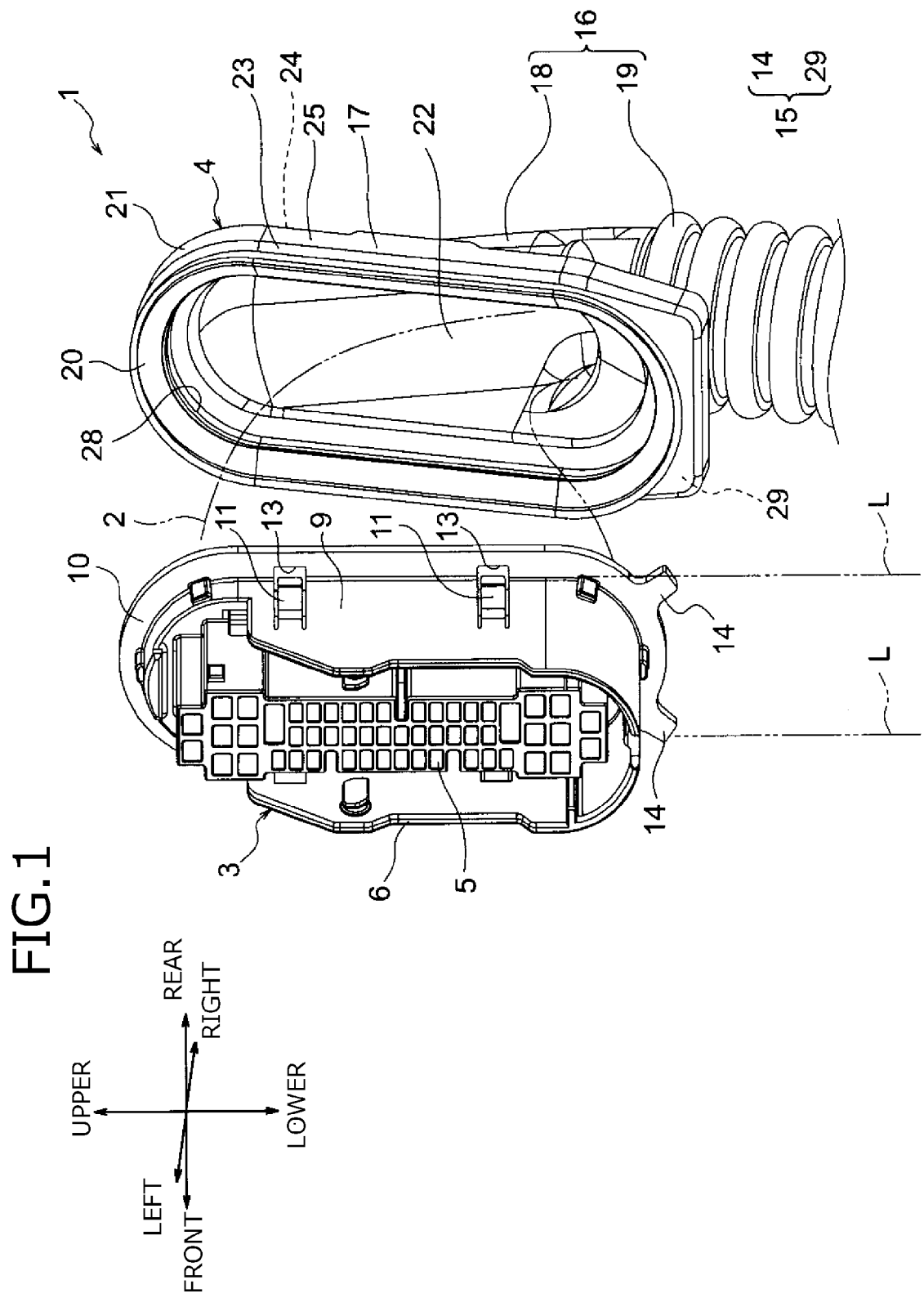
FIG. 1 is a perspective view of a connector and a grommet constituting a grommet-equipped connector of the present invention (first embodiment).
Figure 4:
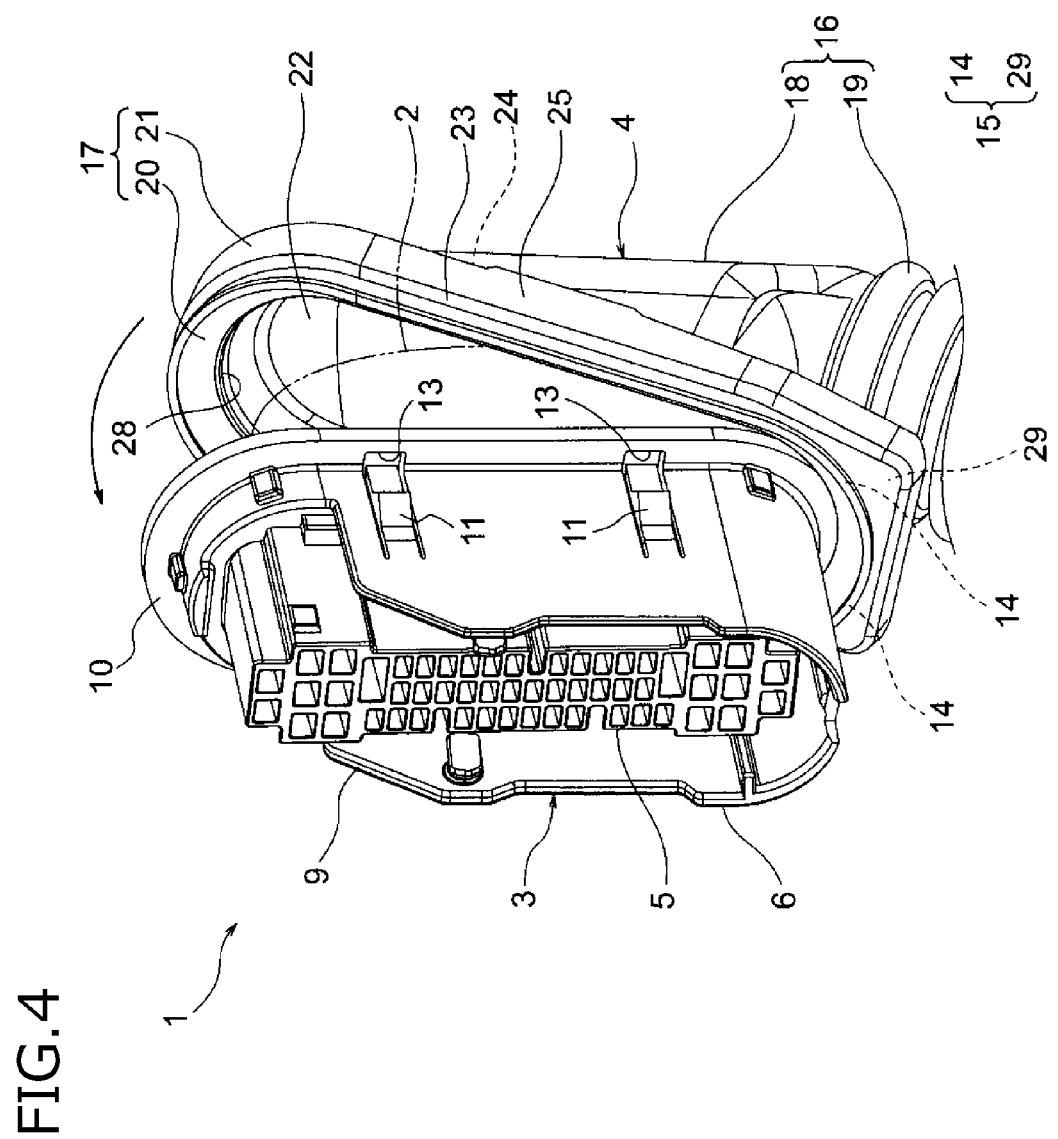
FIG. 4 is a perspective view showing from the right side a condition in the middle of mounting the grommet on the connector (first embodiment).
Figure 5:
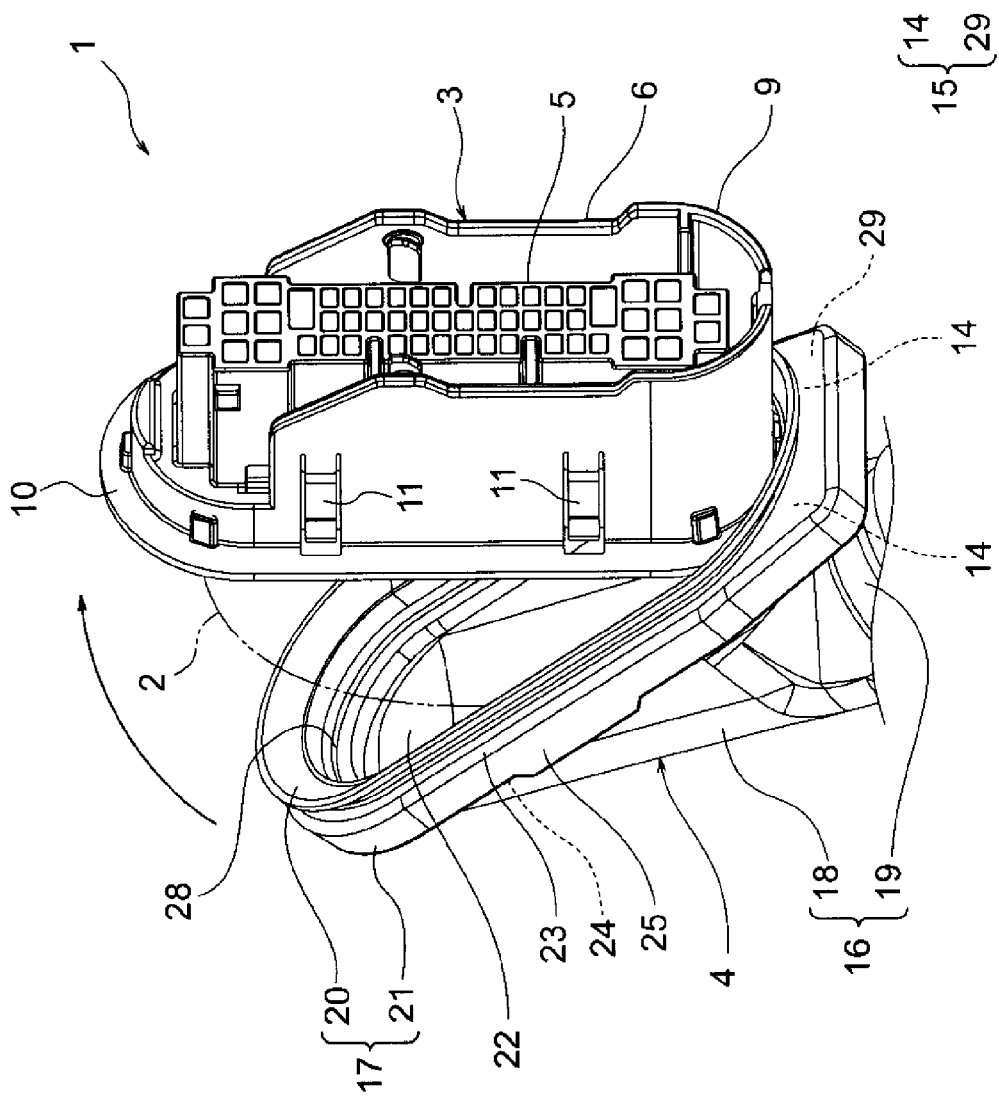
FIG. 5 is a perspective view showing from the left side a condition in the middle of mounting the grommet on the connector (first embodiment).
Figure 6:
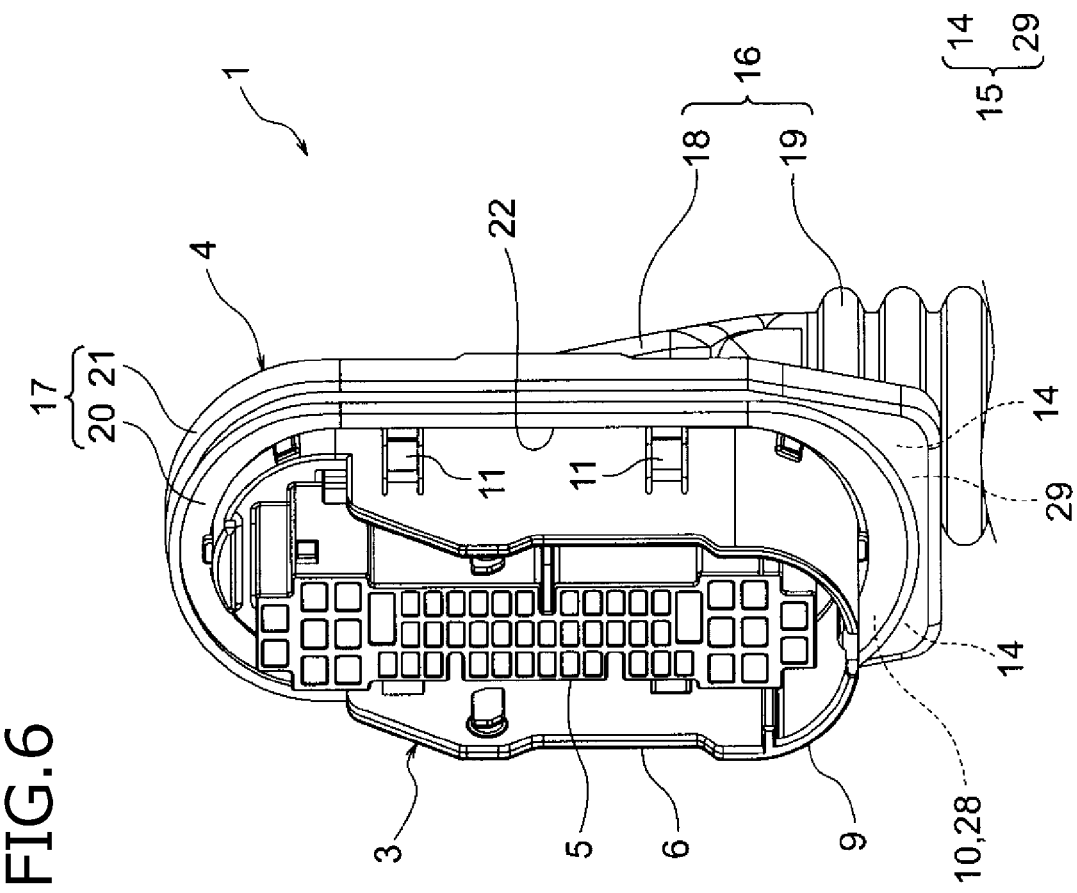
FIG. 6 is a perspective view showing a condition where normal mounting of the grommet on the connector has been performed (first embodiment).
Figure 7:
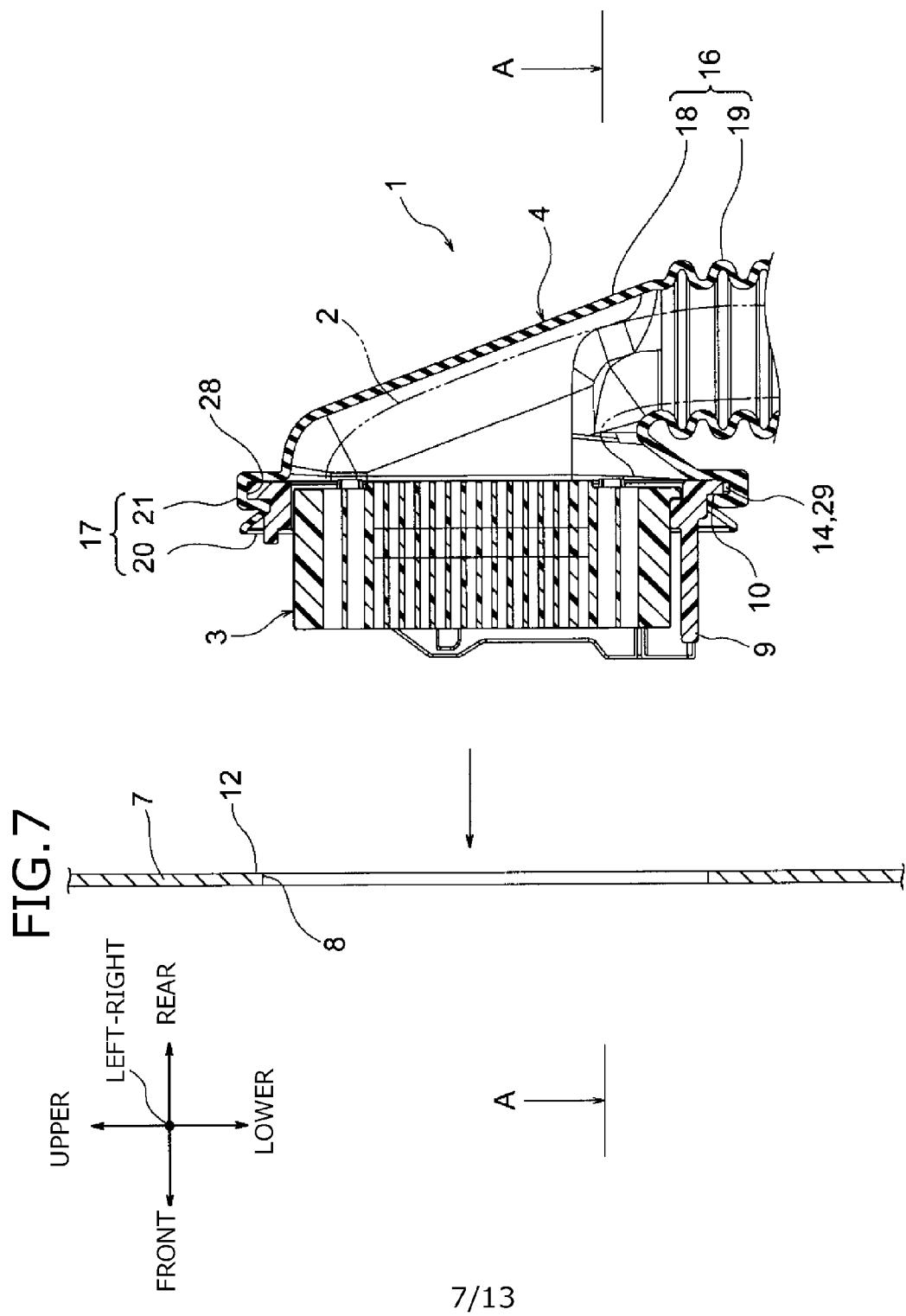
FIG. 7 is a cross-sectional view showing a condition before the grommet-equipped connector is engaged with an attachment hole of a panel (first embodiment).
Figure 8:
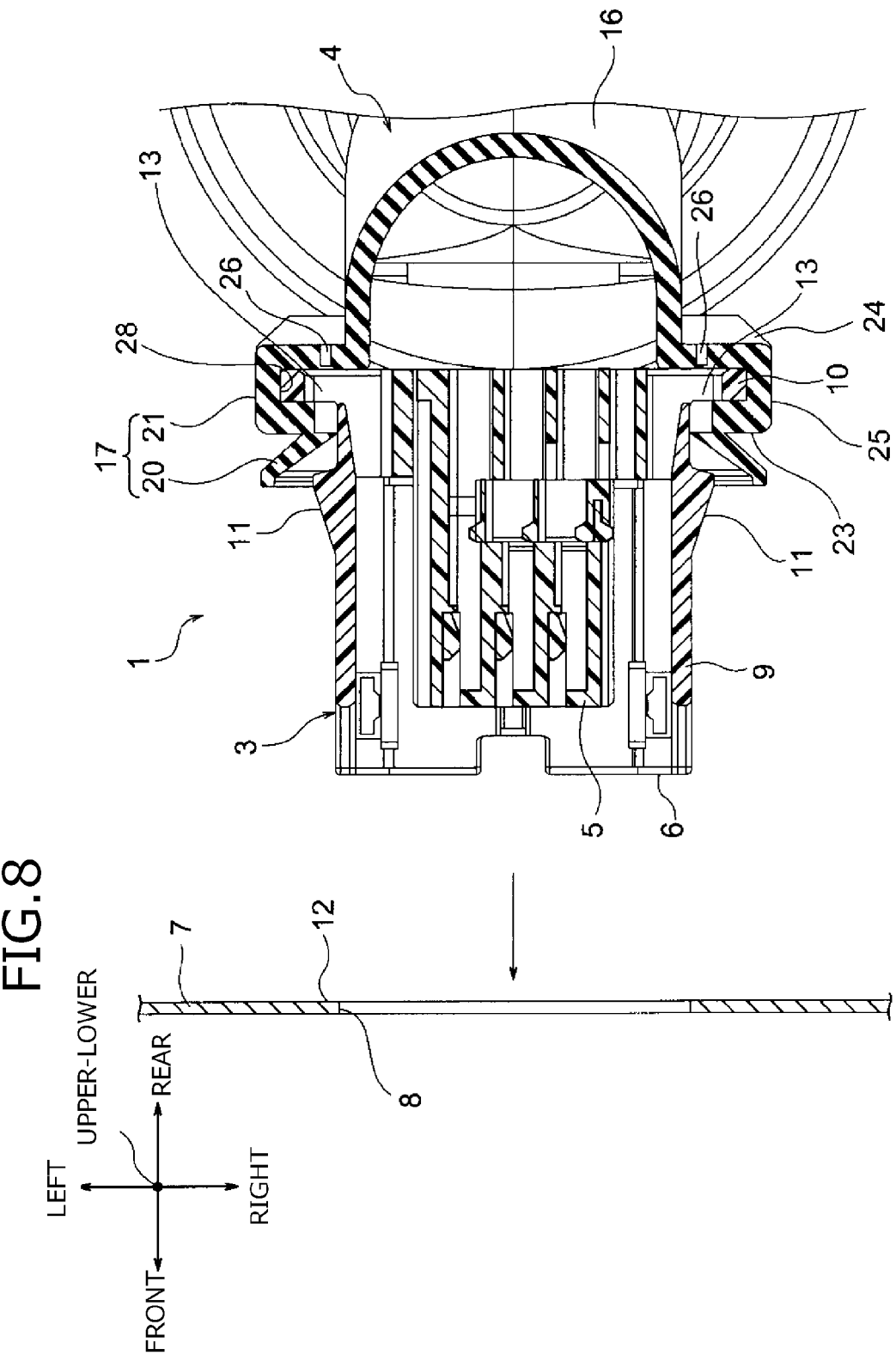
FIG. 8 is a cross-sectional view taken on line A-A of FIG. 7 (first embodiment).
Figure 9:
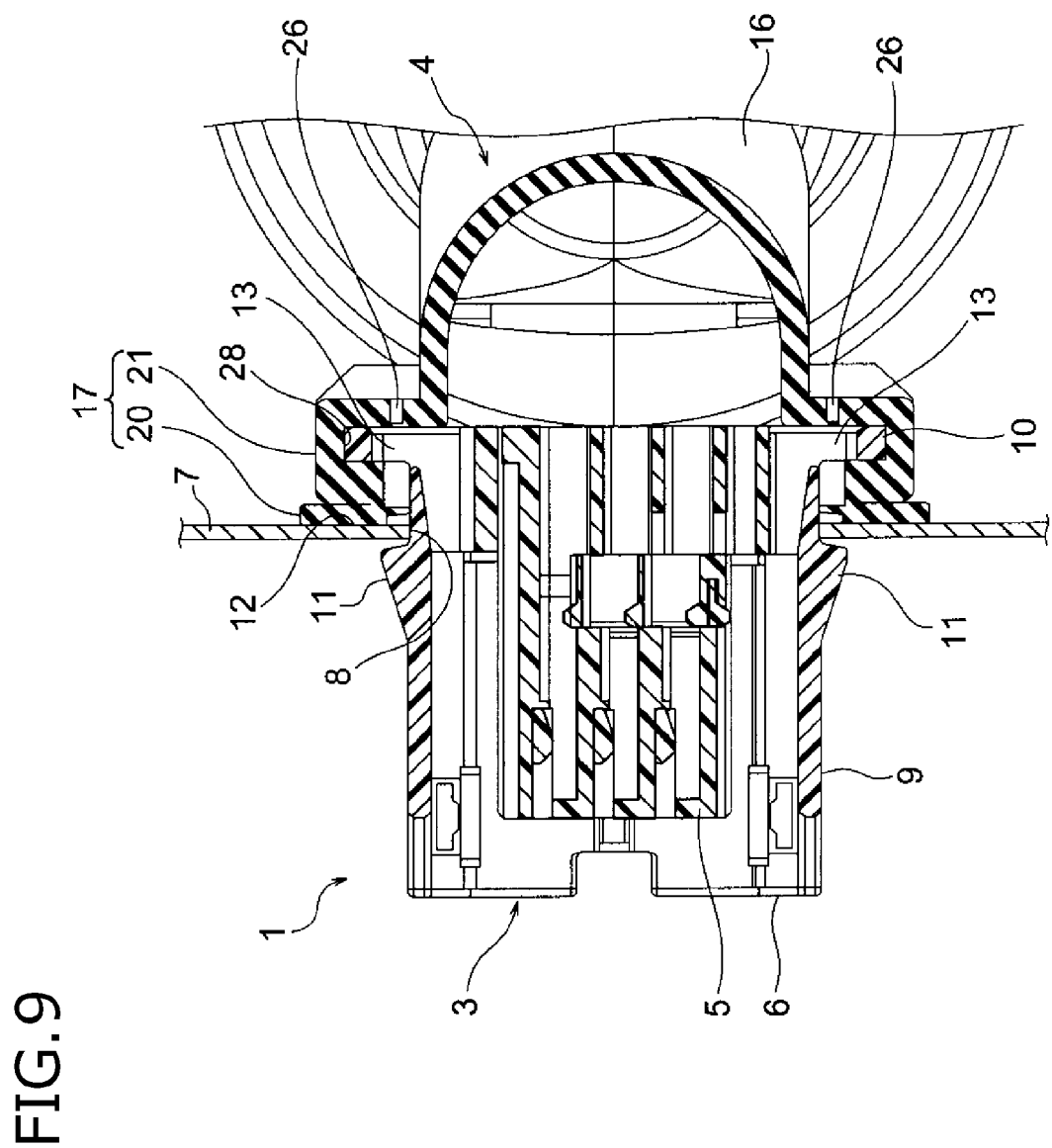
FIG. 9 is a cross-sectional view showing a condition when the grommet-equipped connector is engaged with the attachment hole of the panel (first embodiment).
Figure 10:
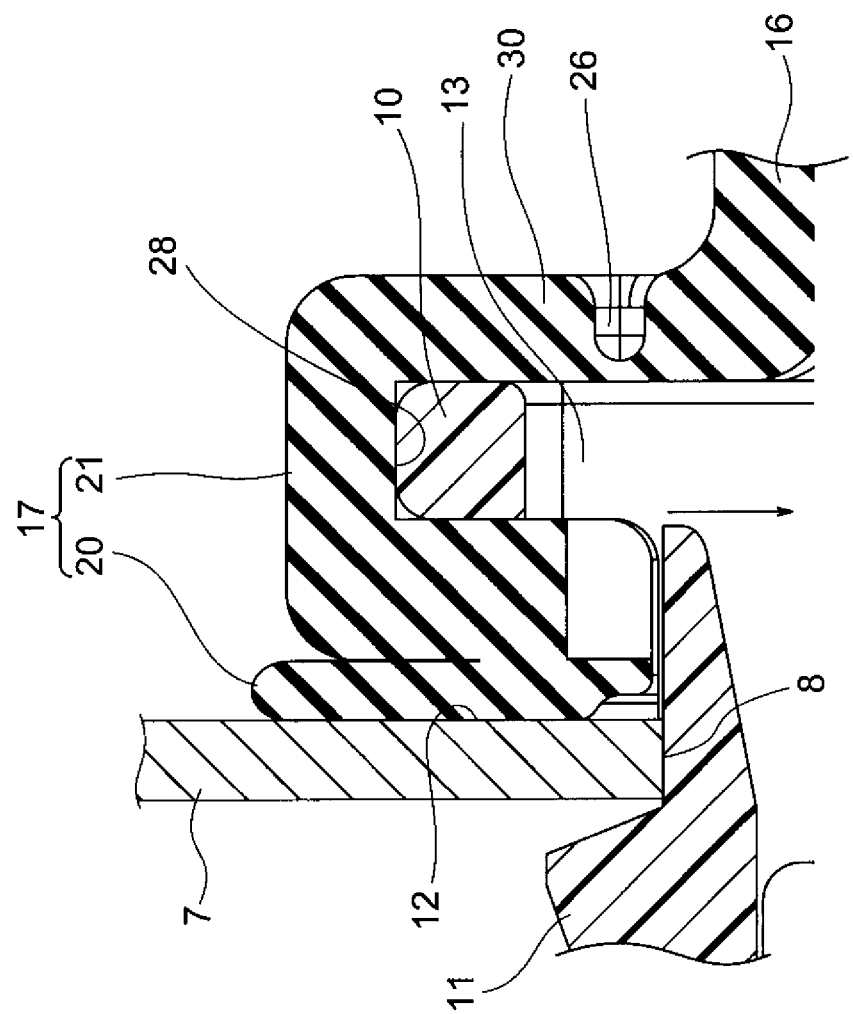
FIG. 10 is a structure explanatory view when easy disassembly of the connector from the panel is performed (first embodiment).

Hereinafter, a first embodiment will be described with reference to the drawings. FIG. 1 is a perspective view of a connector and a grommet constituting a grommet-equipped connector of the present invention. Moreover, FIGS. 2A and 2B are views of the grommet of FIG. 1, FIG. 3 to FIG. 5 are views showing conditions in the middle of mounting the grommet on the connector, FIG. 6 is a view showing a condition where normal mounting of the grommet on the connector has been performed, FIG. 7 is a view showing a condition before the grommet-equipped connector is engaged with the attachment hole of the panel, FIG. 8 shows a cross-sectional view on line A-A of FIG. 7, FIG. 9 shows a condition when the grommet-equipped connector is engaged with the attachment hole of the panel, and FIG. 10 is a structure explanatory view when easy disassembly of the connector from the panel is performed.

<Regarding the Structure of the Grommet-Equipped Connector 1>

In FIG. 1, the grommet-equipped connector 1 is, for example, for establishing electric connection of the door part of a car, and includes a connector 3 provided at the terminal of an electric wire bundle 2 and a grommet 4 made of rubber or elastomer and covering a rear portion of this connector 3 and the electric wire bundle 2. The electric wire bundle 2 is formed of, for example, a plurality of low voltage thin wires tied in a bundle, and at the terminal, a non-illustrated terminal metal fitting constituting the connector 3 is provided.

First, the structure and composition of each of the connector 3 and the grommet 4 will be described in detail. The arrows in FIG. 1 indicate the vertical direction, the horizontal direction and the front-back direction in the present embodiment.

<Regarding the Connector 3>

In FIG. 1, the connector 3 includes a connector housing 5 made of a synthetic resin having an insulation property, the non-illustrated terminal metal fitting housed in a terminal housing chamber of the connector housing 5, and a connector frame 6 made of a synthetic resin and externally fitted to the connector housing 5. The connector 3 is structured so that electric connection can be established through an attachment hole 8 of a panel 7 shown in FIG. 7 to FIG. 9. The connector 3 of the present embodiment is a so-called multipolar connector, and is fitted to a non-illustrated counterpart connector by a lever (by an LIF mechanism).

<Regarding the Connector Frame 6>

In FIG. 1, the connector frame 6 is a member forming the outside part of the connector 3, and has a substantially tubular frame body 9 and a flange 10 continuously formed on a rear portion (rear end) of the frame body 9. The frame body 9 has walls that are straight when viewed from the front and arc-shaped walls, and the rear portion (rear end) of the frame body 9 is formed in the shape of an ellipse that is long in the vertical direction. The frame body 9 is formed in a tubular shape matching the opening shape of the attachment hole 8 of the panel 7 (see FIG. 7 to FIG. 9). On the above-mentioned straight walls, panel engagement portions 11 engaged with the attachment hole 8 are formed. The panel engagement portions 11 are formed in the shape of a cantilever arm having elasticity. Moreover, at the front end of each panel engagement portion 11, an outward protrusion is formed. In the present embodiment, four panel engagement portions 11 are formed.

<Regarding the Flange 10>

In FIG. 1, the flange 10 is an arc-shaped brim portion protruding outward from the rear portion (rear end) of the frame body 9, and is formed so as to face an edge portion 12 of the attachment hole 8 (see FIG. 7 to FIG. 9) (formed so as to be parallel to the edge portion 12). On this flange 10, notched portions 13 and flange protrusion portions 14 as one characteristic portion of the present invention are formed. The notched portions 13 are die cut holes occurring for the formation of the panel engagement portions 11. The notched portions 13 are used at the time of easy disassembly of the grommet-equipped connector 1 in the present invention (easy disassembly will be described later).

<Regarding the Flange Protrusion Portions 14>

In FIG. 1, the flange protrusion portions 14 are formed as substantially rectangular protruding portions constituting the same surface as the flange 10 and such that the end portion of the flange 10 is further protruded outward (in other words, formed as spatula form protruding portions). These flange protrusion portions 14 are formed in such a manner as to be arranged on the lower side arc portion in FIG. 1. Moreover, two flange protrusion portions 14 are formed so as to be symmetric with respect to the central axis (not shown) in the vertical direction (The number is an example. In the case of portions described below, the number may be, for example, one).

The pair of flange protrusion portions 14 are formed in a shape inserted in a later-described deep groove portion 29 of the grommet 4 in a non-through manner. Moreover, the pair of flange protrusion portions 14 are formed in a shape where the protrusion ends are situated outside virtual lines L (on the right and the left in FIG. 1) (the virtual lines L are lines drawn straightly in the vertical direction along the above-mentioned straight walls).

The pair of flange protrusion portions 14 which have the shape where the protrusion ends are situated outside the virtual lines L as described above are formed as portions capable of being guided by a later-described flange fitting groove 28 of the grommet 4 and portions that prevent detachment from the flange fitting groove 28. Such pairs of flange protrusion portions 14 are formed also as one component of a mounting detection portion 15. Moreover, they are formed also as mis-assembly preventing portions when the connector 3 is upside down. The pair of flange protrusion portions 14 serve as work start portions on the side of the connector 3 in the work of mounting the grommet 4 on the connector 3 although this will become apparent in the description that follows (it can be said that one or more than one flange protrusion portion 14 is formed in accordance with the work start portion).

<Regarding the Grommet 4>

In FIG. 1 and FIGS. 2A and 2B, the grommet 4 is a waterproof member (waterproof part) made of rubber or elastomer, and is formed so as to be extendable and bendable. Such a grommet 4 has a tubular electric wire housing portion 16 that covers the electric wire bundle 2 and a panel contact portion 17 fitted so as to cover the flange 10 and intimately contacting the edge portion 12 of the attachment hole 8 (see FIGS. 7 to 9).

<Regarding the Electric Wire Housing Portion 16>

In FIG. 1 and FIGS. 2A and 2B, the electric wire housing portion 16 has a direction changing tubular portion 18 that changes the drawing direction of the electric wire bundle 2 and a bellow-shaped tubular portion 19 as a freely bendable portion, and is formed, for example, in the illustrated shape. The direction changing tubular portion 18 is continuously formed on the rear end of the panel contact portion 17. The direction changing tubular portion 18 is formed so that the electric wire bundle 2 can be made to face down after drawn out from the connector 3. In other words, the direction changing tubular portion 18 is formed so that the drawing direction of the electric wire bundle 2 is toward the protruding side of the pair of flange protrusion portions 14. In the present embodiment, it is in order to facilitate the mounting of the grommet 4 on the connector 3 that the drawing direction of the electric wire bundle 2 is made downward (this is because the work is difficult to perform if the electric wire bundle 2 is drawn out in such a manner as to pass a portion of the grommet 4 that is mounted last, that is, an upper portion in the figure in the present embodiment). While the direction changing tubular portion 18 is formed so as to face downward in the present embodiment in order to facilitate the mounting of the grommet 4, this is an example. That is, unless it faces upward, the electric wire bundle 2 may be drawn out, for example, in the horizontal direction.

<Regarding the Panel Contact Portion 17>

In FIG. 1 and FIGS. 2A and 2B, the panel contact portion 17 has a flexible elastic portion 20 pressed against the edge portion 12 of the attachment hole 8 (see FIG. 7 to FIG. 9) to intimately contacts the edge portion 12, a base portion 21 serving as a base portion of the flexible elastic portion 20 and where some characteristic portions (described later) of the present invention are formed, and an attachment hole 22 communicating with the internal space of the tubular electric wire housing portion 16, and is formed in the illustrated shape.

<Regarding the Flexible Elastic Portion 20>

Figure 3:
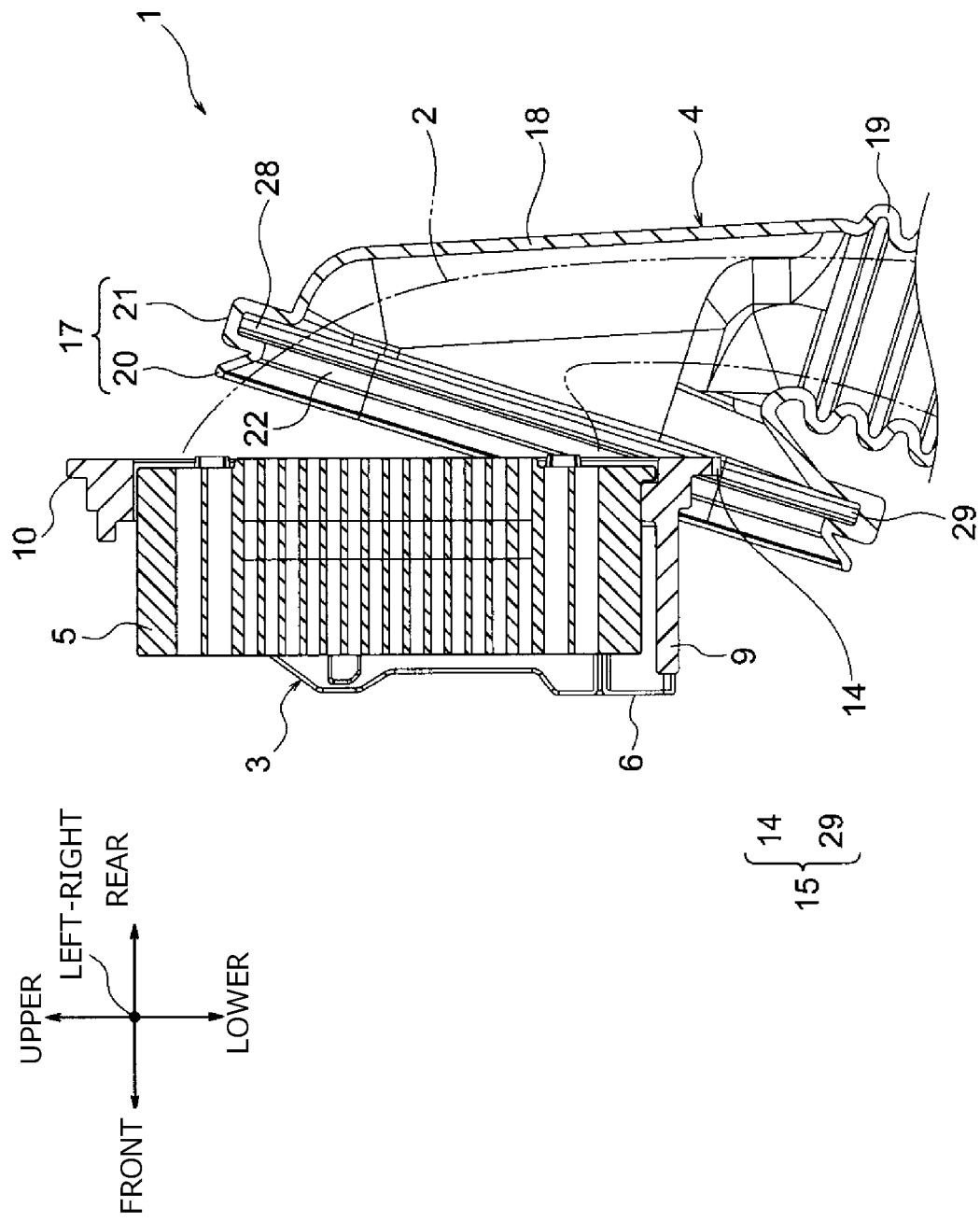
FIG. 3 is a cross-sectional view showing a condition in the middle of mounting the grommet on the connector (first embodiment).

In FIG. 1 and FIG. 3, the flexible elastic portion 20 is formed as an arc-shaped brim portion gradually spreading forward. Moreover, the flexible elastic portion 20 is formed so as to be easily bent when a pressing force is applied (formed so as to elastically return to the original shape when the pressing force is canceled). The flexible elastic portion 20 is formed so as to be watertight against the edge portion 12 of the attachment hole 8 (see FIG. 7 to FIG. 9).

<Regarding the Base Portion 21>

Figure 2:
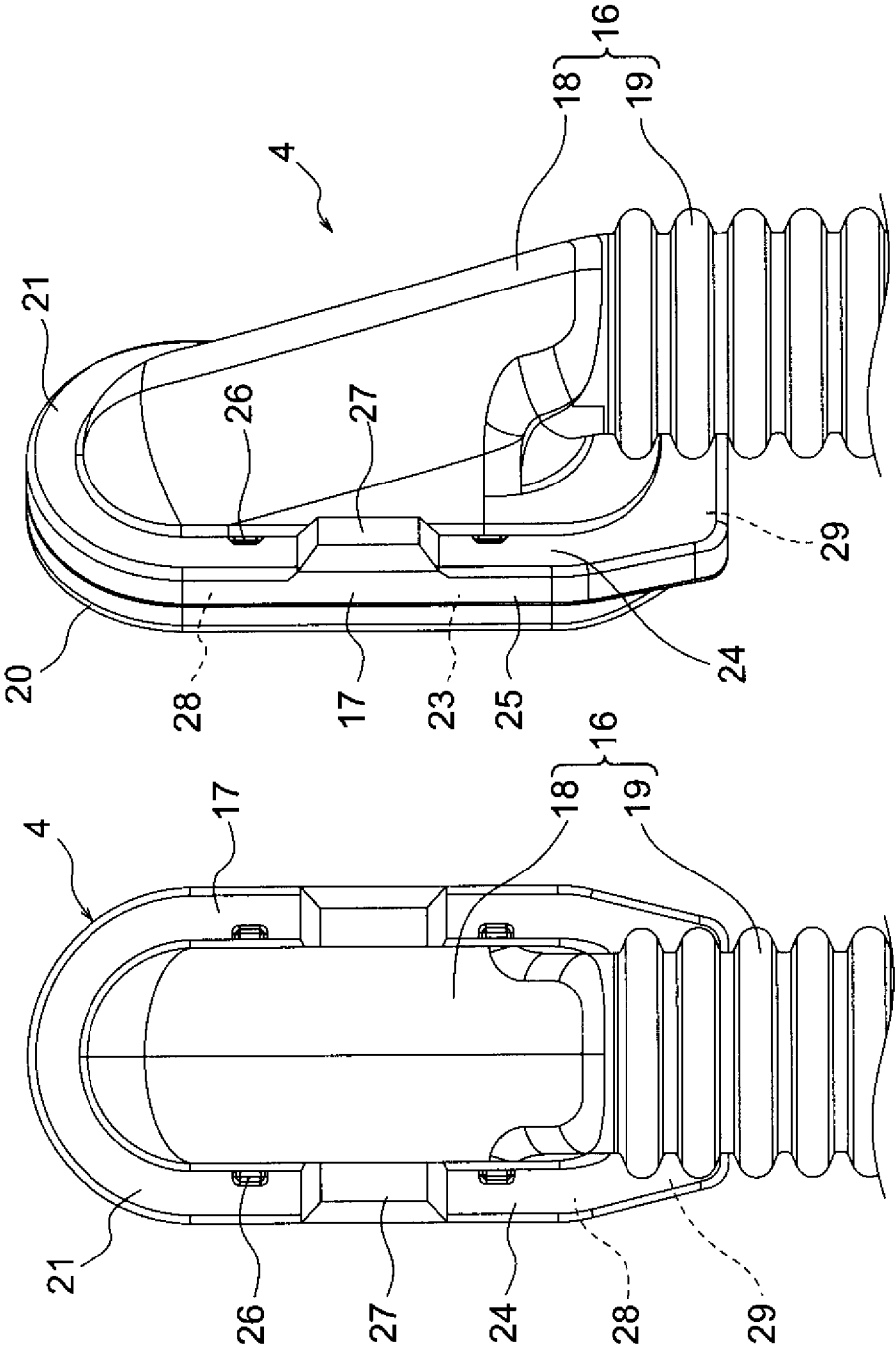
FIGS. 2A and 2B are views of the grommet of FIG. 1.

In FIG. 1 to FIG. 3, the base portion 21 is formed around the attachment hole 22 having the shape of an ellipse that is long in the vertical direction. For this reason, the base portion 21 is formed on a substantially frame-shaped portion on the panel contact portion 17. In explaining the base portion 21, reference numeral 23 indicates the front surface, 24 indicates the rear surface, and 25 indicates the outer peripheral surface.

Although no reference numeral is assigned, the portion facing the attachment hole 22 is the inner peripheral surface.

On the front surface 23 of the base portion 21, the flexible elastic portion 20 is continuously formed. On the rear surface 24 on the side opposite thereto, four thin portions 26 are formed (one characteristic portion of the present invention, and described later). Moreover, on the rear surface 24, a pair of finger pressing portions 27 are also formed (one characteristic portion of the present invention, and described in a second embodiment). On the inner peripheral surface of such a base portion 21 (in other words, inside the panel contact portion 17), the flange fitting groove 28 is formed.

<Regarding the Flange Fitting Groove 28>

In FIG. 1 and FIG. 3, the flange fitting groove 28 is formed as a fitting portion for the flange 10. The flange fitting groove 28 is formed in a groove shape where the entire perimeter of the flange 10 can be inserted. That is, it is formed in a groove shape such that the inner peripheral surface of the base portion 21 is concaved toward the outer peripheral surface 25 and this concave continues one round. The flange fitting groove 28 is formed with an interval in contact with the front surface and the rear surface of the flange 10. Since such a flange fitting groove 28 is provided, the base portion 21 is formed in a U shape in cross section (it is assumed that a part passing through to the outer peripheral surface 25 is absent on the flange fitting groove 28). On the flange fitting groove 28, the deep groove portion 29 as one characteristic portion of the present invention is formed.

<Regarding the Deep Groove Portion 29>

In FIG. 1 to FIG. 3, the deep groove portion 29 is disposed in accordance with the positions of the pair of flange protrusion portions 14 of the flange 10. The deep groove portion 29 is formed as a fitting portion for the pair of flange protrusion portions 14. The deep groove portion 29 is formed as a non-through concave portion that is deeper in groove depth than the flange fitting groove 28. Moreover, the deep groove portion 29 is formed as a concave having the same groove width as that of the flange fitting groove 28 (the groove width is an example, and the shape may be, for example, saclike as in the second embodiment described later). The deep groove portion 29 is formed so that the pair of flange protrusion portions 14 can be handled by one concave. The base portion 21 inside which the deep groove portion 29 is present is formed in a shape where an expanding portion is partially present when viewed from the outside. The deep groove portion 29 is formed as one component of the mounting detection portion 15.

<Regarding the Work of Mounting the Grommet 4 on the Connector 3>

Next, based on the above-described structure and composition, the work of mounting the grommet 4 on the connector 3 will be described. It is assumed that the assembly of the connector 3 and the work of inserting the grommet 4 into the electric wire bundle 2 have been performed in advance.

In the work of mounting the grommet 4 on the connector 3, (1) first, it is performed to move the panel contact portion 17 of the grommet 4 close to the rear portion of the connector 3 as shown in FIG. 1. (2) Then, it is performed to incline the grommet 4 so that the lower portion of the panel contact portion 17 is situated below the lower portion of the connector 3 as shown in FIG. 3. Specifically, it is performed to incline the grommet 4 so that the lower portion of the panel contact portion 17 is situated below the pair of flange protrusion portions 14. (3) Then, it is performed to insert the protrusion ends of the pair of flange protrusion portions 14 into the flange fitting groove 28. In the present embodiment, it is performed to insert into the neighborhood of boundaries between the straight portions and the arc portion of the flange fitting groove 28 as shown in FIG. 3 (The insertion position is an example, and it may be performed to directly insert into the arc portion which is a lower position, that is, the flange fitting groove 28 where the deep groove portion 29 is present. Regarding this insertion, the condition is the same as that shown in FIG. 4 and FIG. 5.). (4) Then, it is performed to pull up the grommet 4 from the inserted condition of FIG. 3. At this time, the protrusion ends of the pair of flange protrusion portions 14 are guided by the flange fitting groove 28 (the protrusion ends are guided so that the grommet 4 is smoothly slid without detached). (5) Then, it is performed to bring the pair of flange protrusion portions 14 into the condition of being inserted in the deep groove portion 29 by the pulling up of the grommet 4 as shown in FIG. 4 and FIG. 5. (6) Then, it is performed to rotate the grommet 4 in the direction of the arrow while pulling it under a condition as if the portion of insertion of the pair of flange protrusion portions 14 and the deep groove portion 29 were the rotation center. (7) Lastly, it is performed to cover the entire perimeter of the flange 10 with the flange fitting groove 28 to bring about the condition as shown in FIG. 6.

By the above, the normal mounting of the grommet 4 on the connector 3 is completed, and the assembly of the grommet-equipped connector 1 is completed.

When the connector 3 of FIG. 1 is upside down, the protrusion of the pair of flange protrusion portions 14 is upward. That is, the grommet 4 cannot be mounted, and as a consequence, it is easily found that the condition is such as half mounting or reverse assembly.

<Regarding the Attachment of the Grommet-Equipped Connector 1 to the Attachment Hole 8 of the Panel 7>

Subsequently, referring to FIG. 7 to FIG. 10, the attachment of the grommet-equipped connector 1 to the attachment hole 8 of the panel 7 will be described.

In FIG. 7 and FIG. 8, on the panel 7, the elliptic attachment hole 8 that is long in the vertical direction is formed. The part of the connector 3 of the grommet-equipped connector 1 is inserted into the attachment hole 8, the panel engagement portions 11 are engaged with the attachment hole 8 as shown in FIG. 9 and the flexible elastic portion 20 of the panel contact portion 17 is pressed against the edge portion 12 of the attachment hole 8 so as to intimately contacts, whereby the attachment of the grommet-equipped connector 1 is completed. In the grommet-equipped connector 1, since the flexible elastic portion 20 is elastically deformed to be pressed against the edge portion 12 as shown in FIG. 10 and at this time, the pressed portion (elastically deformed portion) becomes watertight, waterproofness is sufficiently secured.

In the attachment of the grommet-equipped connector 1 to the attachment hole 8, the use of the pair of finger pressing portions 27 of the grommet 4 is effective. The finger pressing portions 27 will be described later with reference to FIGS. 11A and 11B.

<Regarding the Easy Disassembly of the Grommet-Equipped Connector 1>

In FIGS. 2A and 2B, FIG. 9 and FIG. 10, the four thin portions 26 are formed on the rear surface 24 of the base portion 21 in the panel contact portion 17. These thin portions 26 are formed in such a manner as to be disposed in accordance with the positions of the panel engagement portions 11 in the connector 3. Moreover, as shown in FIG. 10, they are formed in a shape that concaves a wall 30 between the rear surface 24 and the flange fitting groove 28 in the direction of the wall thickness. The thin portions 26 having such a shape are formed as portions for easily detaching (easily disassembling) the grommet-equipped connector 1 from the attachment hole 8 of the panel 7.

In FIG. 10, if easy disassembly becomes necessary, by inserting a jig such as a flat-head screwdriver into the thin portions 26 and applying force so that the thin portions 26 are broken through, the panel engagement portions 11 in a state of being engaged with the attachment hole 8 of the panel 7 can be moved in the direction of the arrow. That is, disengagement of the panel engagement portions 11 can be easily performed, and as a consequence, the grommet-equipped connector 1 can be easily detached (easily disassembled) from the attachment hole 8 of the panel 7 by this disengagement.

Regarding Advantages of the Present Invention

As described above with reference to FIG. 1 to FIG. 10, according to the grommet-equipped connector 1 of the present invention (according to the connector 3), an advantage is produced that the workability at the time of the mounting of the grommet 4 can be improved to be higher than before. Moreover, according to the grommet-equipped connector 1 of the present invention, an advantage is also produced that the detection related to the normal mounting of the grommet 4 can be performed with a simple structure.

Second Embodiment

Hereinafter, the second embodiment will be described with reference to the drawings. FIGS. 11A and 11B are views of a grommet-equipped connector as another example. Components basically the same as those of the above-described first embodiment are denoted by the same reference numerals and detailed descriptions thereof are omitted.

In FIGS. 11A and 11B, the grommet-equipped connector 1 of the second embodiment is different from that of the first embodiment in part of the grommet 4. The second embodiment is different from the first embodiment in that the deep groove portion 29 formed inside the panel contact portion 17 is saclike and the internal space of the deep groove portion 29 spreads rearward. By obliquely housing the connector 3 as shown in the figure by such a deep groove portion 29, the height dimension of the connector 3 can be reduced apparently, and the mounting of the remaining part of the grommet 4 thereafter can be performed with a comparatively small force (the mounting can be performed without the grommet 4 being largely pulled up).

In the second embodiment, by housing the connector 3 obliquely with respect to the large saclike deep groove portion 29 in the internal space and pressing the pair of finger pressing portions 27 with the worker's finger lastly, the connector 3 can be easily moved from the obliquely housed condition to the normal mounting position. Therefore, it is needless to say that the attachment of the grommet-equipped connector 1 to the attachment hole 8 of the panel 7 (see FIG. 7) is not obstructed.

Third Embodiment

Hereinafter, a third embodiment will be described with reference to the drawings. FIGS. 12A and 12B is views of a grommet-equipped connector of the present invention as another example. Components basically the same as those of the above-described first and second embodiments are denoted by the same reference numerals and detailed descriptions thereof are omitted.

In FIGS. 12A and 12B, the grommet-equipped connector 1 of the third embodiment is different from that of the first embodiment in part of the connector 3 and part of the grommet 4. The third embodiment is different from the first embodiment in that the flange 10 in the connector frame 6 is formed in an elastic umbrella shape and that the shape of the panel contact portion 17 is simplified by such an elastic-umbrella-shaped flange 10. It is needless to say that the pressing force can be sufficiently secured at the elastic-umbrella-shaped flange 10 in the third embodiment even though the shape of the panel contact portion 17 is simplified.

In addition, it is needless to say that the present invention may be carried out in various modifications without changing the gist of the present invention.

The present invention may be structured without inclusion of the detection structure related to the normal mounting of the grommet 4. That is, it is necessary only that the connector 3 be provided where the flange protrusion portions 14 are formed on the flange 10 and these flange protrusion portions 14 are guided by the flange fitting groove 28 of the grommet 4.

Here, the details of the above embodiments are summarized as follows.

There is provided a grommet-equipped connector including: a connector that includes: a panel engagement portion configured to be engaged with an attachment hole of a panel; and an annular flange configured to face an edge portion of the attachment hole; and a grommet that includes a panel contact portion configured to be fitted so as to cover the flange and intimately contact the edge portion, wherein a flange fitting groove in which the flange is inserted over an entire perimeter is formed inside the panel contact portion; and wherein the flange has a flange protrusion portion protruding outward and guided by the flange fitting groove.

According to the above configuration, in mounting the grommet on the connector, the flange protrusion portion is guided by the flange fitting groove. By the formation of the flange protruding portion, detachment from the flange fitting groove never occurs and the flange protrusion portion is guided by the flange fitting groove, so that the mounting of the grommet can be smoothly performed. In addition, the formation of the flange protrusion portion enables simplification of the structure of the grommet itself.

Also, an advantage is produced in that the workability at the time of the mounting of the grommet can be improved.

For example, the flange fitting groove has a deep groove portion of a concave shape or a saclike shape that is deeper in groove depth than the flange fitting groove, and the flange protrusion portion being inserted into the deep groove portion in a non-through manner.

According to the above configuration, when the flange protrusion portion is inserted in the deep groove portion, the mounting of the grommet on the connector can be performed to the last. Conversely, if the flange protrusion portion is not inserted in the deep groove portion (in the condition where the flange protrusion portion is situated in the flange fitting groove), the relative positional relationship between the connector and the grommet is shifted by the protruding length of the flange protrusion portion, and as a consequence, the mounting of the grommet is restricted and the mounting cannot be performed to the last.

Also, the detection related to the normal mounting of the grommet can be performed with a simple structure.

For example, the panel contact portion has a thin portion disposed in correspondence with a position of the panel engagement portion and having a shape that concaves a wall in a direction of a wall thickness.

According to the above configuration, disassembly of the connector from the panel can be easily performed. Specifically, by inserting a jig such as a flat-head screwdriver into the thin portion and applying force so that the thin portion is broken through, the panel engagement portion in a state of being engaged with the attachment hole of the panel can be easily disengaged.

Also, the easy disassembly of the grommet-equipped connector from the panel can be performed.

For example, the deep groove portion is formed in the saclike shape, and a finger pressing portion capable of pressing the connector with a finger over the panel contact portion is formed on the panel contact portion.

According to the present invention having such a feature, the mounting of the grommet on the connector can be easily performed without pulling with a large force. Specifically, by obliquely housing the connector in the deep groove portion having the saclike shape with a large internal space and reducing the height dimension apparently, the mounting of the remaining part of the grommet thereafter can be performed with a comparatively small force (can be performed without large pulling up). And by lastly pressing the finger pressing portion with the worker's finger on the connector in an obliquely housed condition, the movement of the connector to the normal mounting position can be easily performed. Consequently, the mounting of the grommet can be easily performed.

Also, the workability at the time of the mounting of the grommet can be further improved.

For example, the grommet has a tubular electric wire housing portion for housing an electric wire bundle drawn out from the connector, the tubular electric wire housing portion being provided continuously with the panel contact portion, and the electric wire housing portion has a direction changing tubular portion that directs a drawing direction of the electric wire bundle toward a protruding direction of the flange protruding portion.

According to the present invention having such a feature, in mounting the grommet on the connector, the work on the part on which this mounting is performed last can be easily performed. This is because the drawing direction of the electric wire bundle becomes a direction not passing the above-mentioned last-mounted part. That is, this is because the drawn-out part of the electric wire bundle comes not to obstruct the mounting work.

Also, the drawing direction of the electric wire bundle is toward the protruding direction of the flange protrusion portion, it is needless to say that any direction is sufficiently effective as long as it is a direction not passing the above-mentioned last-mounted part.

Also, the workability at the time of the mounting of the grommet can be further improved.

Moreover, there is a connector includes an annular flange configured to face an edge portion of an attachment hole of a panel, an entire perimeter of the flange is configured to be inserted in and covered by a flange fitting groove of a panel contact portion of a grommet intimately contacting the edge portion, and the flange has a flange protrusion portion that protrudes outward and is configured to be guided by the flange fitting groove.

According to the above configuration, in mounting the grommet on the connector, the flange protrusion portion is guided by the flange fitting groove. By the formation of the flange protruding portion, detachment from the flange fitting groove never occurs and the flange protrusion portion is guided by the flange fitting groove, so that the mounting of the grommet can be smoothly performed. In addition, the formation of the flange protrusion portion enables simplification of the structure of the grommet itself.

Also, an advantage is produced in that the workability at the time of the mounting of the grommet can be improved.

What is claimed is:

1. A grommet-equipped connector comprising:
    a connector that comprises:
        a panel engagement portion configured to be engaged with an attachment hole of a panel; and
        an annular flange configured to face an edge portion of the attachment hole; and
    a grommet that comprises a panel contact portion configured to be fitted so as to cover the flange and intimately contact the edge portion,
    wherein a flange fitting groove in which the flange is inserted over an entire perimeter is formed inside the panel contact portion, the flange fitting groove has a first groove portion and a deep groove portion, the first groove portion has a first groove depth, and the deep groove portion has a second groove depth that is deeper than the first groove depth; and
    wherein the flange has a pair of flange protrusion portions protruding outward, guided by the flange fitting groove, and inserted into the deep groove portion.

2. The grommet-equipped connector according to claim 1, wherein the panel contact portion has a thin portion disposed in correspondence with a position of the panel engagement portion and having a shape that concaves a wall of the panel contact portion in a direction of a wall thickness of the wall.

3. The grommet-equipped connector according to claim 1, wherein the grommet has a tubular electric wire housing portion for housing an electric wire bundle drawn out from the connector, the tubular electric wire housing portion being provided continuously with the panel contact portion; and
    wherein the electric wire housing portion has a direction changing tubular portion that directs a drawing direction of the electric wire bundle toward a protruding direction of the flange protruding portion.

4. The grommet-equipped connector according to claim 1, wherein the flange fitting groove has a deep groove portion of a concave shape or a saclike shape, and the flange protrusion portions being inserted into the deep groove portion in a non-through manner.

5. The grommet-equipped connector according to claim 4, wherein the deep groove portion is formed in the saclike shape; and
    wherein a finger pressing portion capable of pressing the connector with a finger over the panel contact portion is formed on the panel contact portion.

6. A grommet-equipped connector comprising:
    a connector that comprises:
        a panel engagement portion configured to be engaged with an attachment hole of a panel; and
        an annular flange configured to face an edge portion of the attachment hole; and
    a grommet that comprises a panel contact portion configured to be fitted so as to cover the flange and intimately contact the edge portion,
    wherein a flange fitting groove in which the flange is inserted over an entire perimeter is formed inside the panel contact portion;
    wherein the flange has a flange protrusion portion protruding outward and guided by the flange fitting groove; and
    wherein the flange fitting groove has a deep groove portion of a concave shape or a saclike shape that is deeper in groove depth than the flange fitting groove, and the flange protrusion portion being inserted into the deep groove portion in a non-through manner.

* * * * *